United States Patent
Crouch et al.

(10) Patent No.: US 9,039,794 B2
(45) Date of Patent: May 26, 2015

(54) REFORMER TUBE APPARATUS HAVING VARIABLE WALL THICKNESS AND ASSOCIATED METHOD OF MANUFACTURE

(75) Inventors: Philip Crouch, Brookfield, WI (US); Gerald Gapinski, Dousman, WI (US); Robert Smickley, Signal Mountain, TN (US); Brian W. Voelker, Concord, NC (US); Gilbert Y. Whitten, Mooresville, NC (US)

(73) Assignees: Midrex Technologies, Inc., Charlotte, NC (US); MetalTek International, Inc., Waukesha, WI (US)

( * ) Notice: Subject to any disclaimer, the term of this patent is extended or adjusted under 35 U.S.C. 154(b) by 1129 days.

(21) Appl. No.: 12/940,635

(22) Filed: Nov. 5, 2010

(65) Prior Publication Data
US 2012/0114533 A1 May 10, 2012

(51) Int. Cl.
| | |
|---|---|
| *B01J 7/00* | (2006.01) |
| *C01B 3/38* | (2006.01) |
| *B01J 8/06* | (2006.01) |
| *B01J 19/02* | (2006.01) |

(Continued)

(52) U.S. Cl.
CPC . *C01B 3/38* (2013.01); *B01J 8/062* (2013.01); *B01J 19/02* (2013.01); *B01J 2219/0277* (2013.01); *C01B 2203/0227* (2013.01); *C01B 2203/06* (2013.01); *C01B 2203/0816* (2013.01); *C01B 2203/1241* (2013.01); *C21B 13/0073* (2013.01); *C21B 13/02* (2013.01)

(58) Field of Classification Search
CPC ............. B01J 19/00; B01J 2208/00212; B01J 2219/00094; B23P 11/00; C01B 2203/0205; F28D 7/163; F28D 7/16; F27D 1/0033
See application file for complete search history.

(56) References Cited

U.S. PATENT DOCUMENTS

| | | | |
|---|---|---|---|
| 2,327,804 A | 8/1943 | Koehring | |
| 2,871,008 A | 1/1959 | Spire | |
| 3,689,048 A | 9/1972 | Foulard et al. | |

(Continued)

FOREIGN PATENT DOCUMENTS

| | | |
|---|---|---|
| JP | 01-191751 | 1/1989 |
| JP | 04-314806 | 6/1991 |
| JP | 04-314805 | 6/1992 |

*Primary Examiner* — Imran Akram
(74) *Attorney, Agent, or Firm* — Clements Bernard PLLC; Christopher L. Bernard; Lawrence A. Barratta, Jr.

(57) ABSTRACT

The present invention provides a reformer tube apparatus, including: an axially aligned tubular structure including a flange section, a top section, a middle section, and a bottom section; wherein the top section of the axially aligned tubular structure includes a first portion having a first wall thickness; wherein the top section of the axially aligned tubular structure includes a second portion having a second wall thickness; and wherein the top section of the axially aligned tubular structure includes a third portion having a transitioning wall thickness that joins the first portion to the second portion. The flange section includes a concentric flange disposed about a top portion thereof. The bottom section of the tubular structure includes a plurality of concentric wedge structures disposed about the interior thereof. The bottom section of the tubular structure also includes a recess disposed about the exterior thereof. The axially aligned tubular structure further includes a secondary flange section coupled to the flange section, wherein the secondary flange section includes a concentric flange disposed about a top portion thereof. Optionally, the reformer tube apparatus is disposed within a reformer used in a direct reduction process.

18 Claims, 3 Drawing Sheets

(51) Int. Cl.
*C21B 13/00* (2006.01)
*C21B 13/02* (2006.01)

(56) References Cited

U.S. PATENT DOCUMENTS

| | | | |
|---|---|---|---|
| 3,743,500 A | 7/1973 | Foulard et al. | |
| 4,179,103 A | 12/1979 | Bentz et al. | |
| 4,493,636 A * | 1/1985 | Haldipur et al. | 431/170 |
| 4,529,381 A | 7/1985 | Michelson | |
| 4,898,369 A | 2/1990 | Perri | |
| 4,903,948 A | 2/1990 | Wolf et al. | |
| 5,022,853 A | 6/1991 | Powell et al. | |
| 5,958,364 A | 9/1999 | Dunn et al. | |
| 6,524,356 B2 | 2/2003 | Fournier et al. | |
| 2006/0013759 A1 * | 1/2006 | Jiang et al. | 423/648.1 |
| 2007/0237693 A1 * | 10/2007 | Burd et al. | 422/197 |
| 2008/0038144 A1 | 2/2008 | Maziasz et al. | |
| 2008/0107938 A1 * | 5/2008 | Lee et al. | 429/20 |
| 2009/0100752 A1 * | 4/2009 | Sessa et al. | 48/65 |

* cited by examiner

REFORMER TUBE APPARATUS HAVING VARIABLE WALL THICKNESS AND ASSOCIATED METHOD OF MANUFACTURE

FIELD OF THE INVENTION

The present invention relates generally to a reformer that is used to reform gas in a direct reduction (DR) process, for example. More specifically, the present invention relates to a reformer tube apparatus having a variable wall thickness. Optionally, the reformer tube apparatus is manufactured from a novel metallurgical alloy.

BACKGROUND OF THE INVENTION

Processes for making reformed gases of various types are widely used throughout the world, and have particular application in connection with direct reduced iron (DRI) plants. In the DR process, the reformer is used to reform natural gas ($CH_4$) with the oxidants $CO_2$ and $H_2O$ from a recycled process gas obtained from a reduction furnace, also referred to as a shaft furnace, for example. The reductants CO and $H_2$ are formed in the reforming reaction, which are then used at elevated temperature to reduce iron oxide ($Fe_2O_3$), i.e. iron ore, to metallic iron (Fe) in the reduction furnace. The metallic iron is subsequently processed into various steel grades for fabricating final products.

This DR process is illustrated generally in FIG. 1, and includes three major steps: reduction, reformation, and heat recovery. In the reduction step, the iron oxide, in pellet or lump form, is introduced at the top of the reduction furnace 10 through a proportioning hopper 12. As the iron oxide descends through the reduction furnace 10 by gravity flow, it is heated and the oxygen is removed from the iron, i.e. the iron oxide is reduced, by counter-flowing gases that have high contents of the reductants CO and $H_2$. These gases react with the $Fe_2O_3$ in the iron ore and convert it to the metallic iron, leaving the oxidants $CO_2$ and $H_2O$. Accordingly, the reduction furnace 10 has three distinct zones in which the DR process is carried out: a reduction zone, a transition zone, and a cooling zone. For the production of cold DRI, the metallic iron is cooled and carburized by counter-flowing cooling gases in the lower portion of the reduction furnace 10. The DRI may also be discharged hot, and fed to a briquetting machine for the production of hot briquetted iron (HBI), or fed hot, as hot direct reduced iron (HDRI), directly to an electric arc furnace (EAF), etc.

In the reformation step, in order to maximize reforming efficiency, recycled process gas from the reduction furnace 10 is blended with fresh natural gas and fed to the reformer 14, a refractory lined furnace including one or more metallurgical alloy reformer tube apparatuses 16 filled with a catalyst, such as nickel or nickel alumina. The gas is heated and reformed as it passes through the reformer tube apparatuses 16. The newly reformed gas, containing 90-92% CO and $H_2$, is then fed hot directly to the reduction furnace 10 as the reducing gas.

In the heat recovery step, the thermal efficiency of the reformer 14 is maximized. Heat is recovered from the reformer flue gas and used to preheat the reformer feed gas mixture, the burner combustion air, and the natural gas feed. Optionally, the reformer fuel gas is also preheated.

Since the presence of oxidants in the reformed gas would hinder the reduction reaction, the reformer feed gas mixture must contain sufficient oxidants to react with the natural gas, plus sufficient excess oxidants to protect the catalyst. This is referred to as stoichiometric reforming. The reductant-to-oxidant ratio in the reformed gas is typically about 11-to-1.

The reforming reaction is endothermic. Thus, the input of heat is required for the reaction. The reforming reaction takes place in the presence of a catalyst to accelerate the reaction rate. Because one of the oxidants is $CO_2$, the reformer 14 must be operated at higher temperatures than conventional steam reformers.

Conventional reformer tube apparatuses 16 are manufactured from various metallurgical alloys to design specifications that result in a life span of 7-10 years at controlled operating temperatures. A set of replacement tubes 16 may cost upwards of $10,000,000.00, representing a significant cost to the operator of a DRI plant, for example. Thus, it would be advantageous if the tubes 16 were capable of operating at current temperature levels for longer periods of time. Likewise, it would be advantageous if the tubes 16 were capable of operating at increased temperature levels for the same period of time. Both situations would provide an increase in the production output of the reformer 14, thereby providing an increase in the production output of the DRI plant, and, ultimately, profits.

Most conventional tubes 16 eventually fail at their top section, near the reformer roof. This localized section gradually creeps and grows in diameter, forming a "bulge." This is an area of unwanted deformation and wall thinning. Conventional approaches to solving this problem include increasing the wall thickness of the entire tube 16, resulting in increased overall weight, less efficient heat transfer, support issues, and increased incidental tube stretching, all resulting in significant additional cost. A solution to this problem is needed, but has not been developed by those of ordinary skill in the art.

BRIEF SUMMARY OF THE INVENTION

In various exemplary embodiments, the present invention provides a reformer tube apparatus having a variable wall thickness and manufactured from a novel metallurgical alloy. This design and material combination results is longer operation at current temperature requirements or equal operation at increased temperature requirements. Wall thickness is increased only at localized sections of the reformer tube apparatus, where resistance to deformation is required. Transitions to conventional thicknesses are provided, and are gradual, such that stresses are minimized as compared to welded joints. It is expected that 4-6 years of tube life may be added, or that tube temperatures, and overall DR process production, may be increased accordingly.

In one exemplary embodiment, the present invention provides a reformer tube apparatus, including: an axially aligned tubular structure; wherein the axially aligned tubular structure includes a first portion having a first wall thickness; wherein the axially aligned tubular structure includes a second portion having a second wall thickness; and wherein the axially aligned tubular structure includes a third portion having a transitioning wall thickness that joins the first portion to the second portion. The axially aligned tubular structure further includes a flange section, wherein the flange section includes a concentric flange disposed about a top portion thereof. The axially aligned tubular structure further includes a top section, wherein the first portion and the second portion of the axially aligned tubular structure are portions of the top section. The axially aligned tubular structure further includes a middle section. The axially aligned tubular structure further includes a bottom section. The bottom section of the tubular structure includes a plurality of concentric wedge structures disposed about the interior thereof. The bottom section of the tubular structure also includes a recess disposed about the exterior thereof. The axially aligned tubular structure further includes a secondary flange section, wherein the secondary flange section includes a concentric flange disposed about a top portion thereof. Optionally, the reformer tube apparatus is disposed within a reformer used in a direct reduction process.

In another exemplary embodiment, the present invention provides a reformer tube apparatus, including: an axially aligned tubular structure including a flange section, a top section, a middle section, and a bottom section; wherein the top section of the axially aligned tubular structure includes a first portion having a first wall thickness; wherein the top section of the axially aligned tubular structure includes a second portion having a second wall thickness; and wherein the top section of the axially aligned tubular structure includes a third portion having a transitioning wall thickness that joins the first portion to the second portion. The flange section includes a concentric flange disposed about a top portion thereof. Optionally, the first wall thickness is greater than the second wall thickness. The bottom section of the tubular structure includes a plurality of concentric wedge structures disposed about the interior thereof. The bottom section of the tubular structure also includes a recess disposed about the exterior thereof. The axially aligned tubular structure further includes a secondary flange section coupled to the flange section, wherein the secondary flange section includes a concentric flange disposed about a top portion thereof. Optionally, the reformer tube apparatus is disposed within a reformer used in a direct reduction process.

In a further exemplary embodiment, the present invention provides a method for providing a reformer tube apparatus, including: providing an axially aligned tubular structure including a flange section, a top section, a middle section, and a bottom section; wherein the top section of the axially aligned tubular structure includes a first portion having a first wall thickness; wherein the top section of the axially aligned tubular structure includes a second portion having a second wall thickness; and wherein the top section of the axially aligned tubular structure includes a third portion having a transitioning wall thickness that joins the first portion to the second portion. The flange section includes a concentric flange disposed about a top portion thereof. Optionally, the first wall thickness is greater than the second wall thickness. The bottom section of the tubular structure includes a plurality of concentric wedge structures disposed about the interior thereof. The bottom section of the tubular structure also includes a recess disposed about the exterior thereof. The axially aligned tubular structure further includes a secondary flange section coupled to the flange section, wherein the secondary flange section includes a concentric flange disposed about a top portion thereof.

BRIEF DESCRIPTION OF THE DRAWINGS

The present invention is illustrated and described herein with reference to the various drawings, in which like reference numbers are used to denote like apparatus components/method steps, as appropriate, and in which.

DETAILED DESCRIPTION OF THE INVENTION

Figure 1:
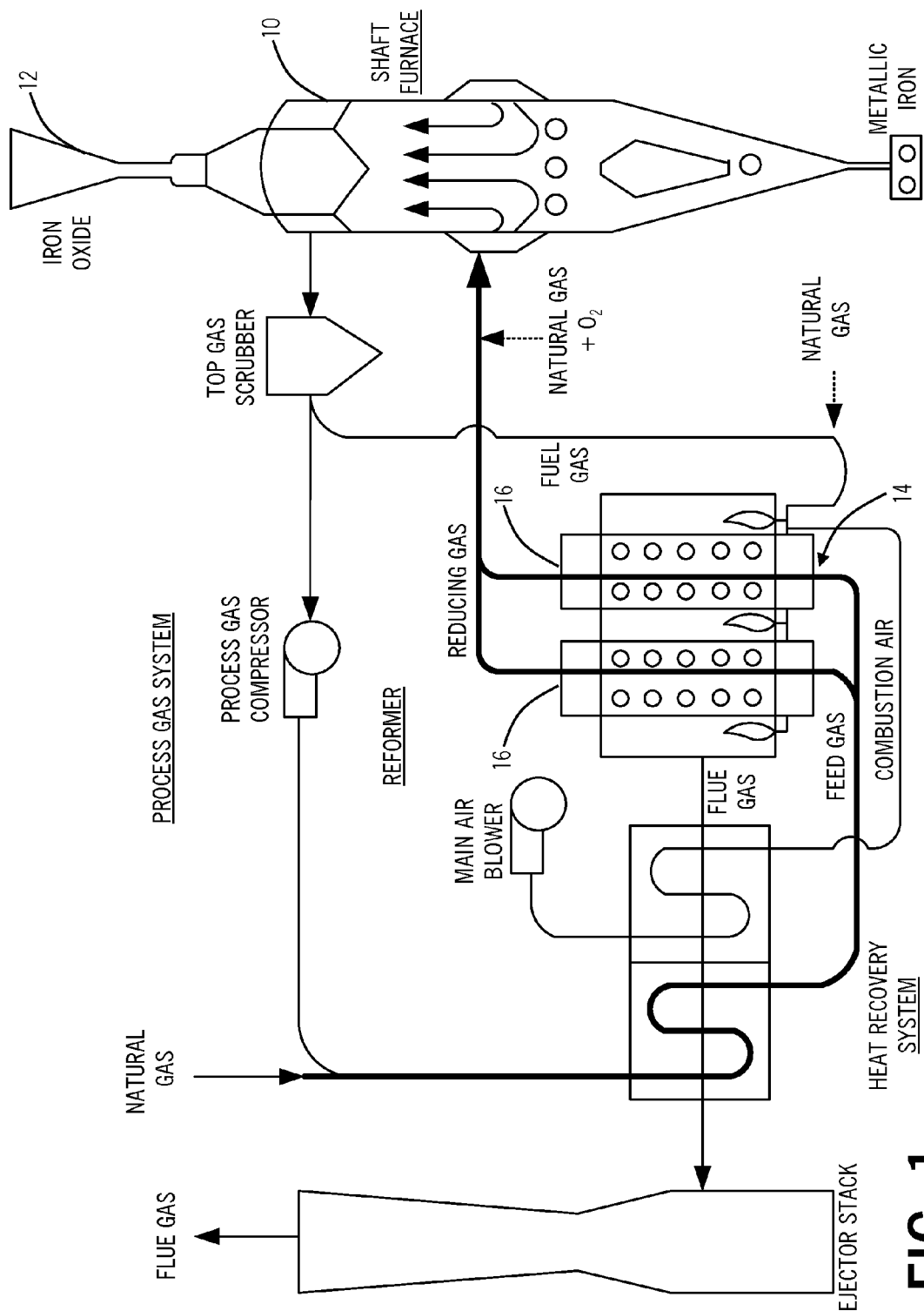
FIG. 1 is a schematic diagram illustrating one exemplary embodiment of a DR process with which the reformer tube apparatus of the present invention may be utilized.
Figure 2:
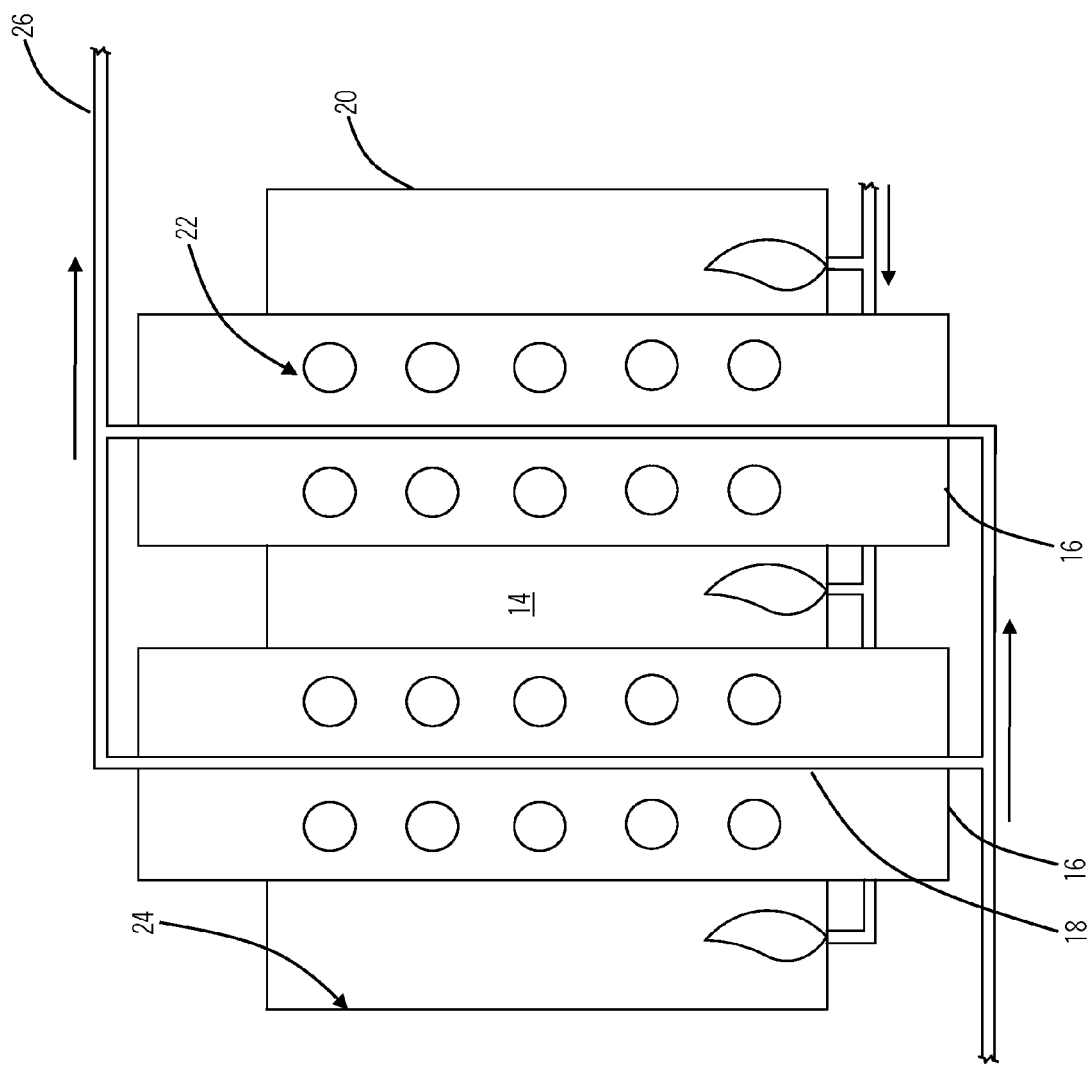
FIG. 2 is a schematic diagram illustrating one exemplary embodiment of a reformer with which the reformer tube apparatus of the present invention may be utilized.

Referring to FIG. 2, in the reformer 14, in order to maximize reforming efficiency, recycled process gas from the reduction furnace 10 (FIG. 1) is blended with fresh natural gas and fed to the reformer 14 as reformer feed gas 18. The reformer 14 includes a refractory lined furnace 20 including one or more metallurgical alloy reformer tube apparatuses 16 filled with a catalyst 22. The refractory material 24 includes a ceramic fiber blanket, for example. In the embodiment illustrated, two reformer tube apparatuses 16 are illustrated, however, it will be readily apparent to those of ordinary skill in the art that any number of reformer tube apparatuses 16 may be utilized. In the reformer 14, the reformer feed gas 18 is heated and reformed as it passes through the reformer tube apparatuses 16. The newly reformed gas, containing 90-92% CO and $H_2$, is then fed hot directly to the reduction furnace 10 as the reducing gas 26.

Again, in the reduction step, the iron oxide, in pellet or lump form, is introduced at the top of the reduction furnace 10 through a proportioning hopper 12 (FIG. 1). As the iron oxide descends through the reduction furnace 10 by gravity flow, it is heated and the oxygen is removed from the iron, i.e. the iron oxide is reduced, by counter-flowing gases that have high contents of the reductants CO and $H_2$. These gases react with the $Fe_2O_3$ in the iron ore and convert it to the metallic iron, leaving the oxidants $CO_2$ and $H_2O$. Accordingly, the reduction furnace 10 has three distinct zones in which the DR process is carried out: a reduction zone, a transition zone, and a cooling zone. For the production of cold DRI, the metallic iron is cooled and carburized by counter-flowing cooling gases in the lower portion of the reduction furnace 10. The DRI may also be discharged hot, and fed to a briquetting machine for the production of HBI, or fed hot, as HDRI, directly to an EAF, etc.

Figure 3:
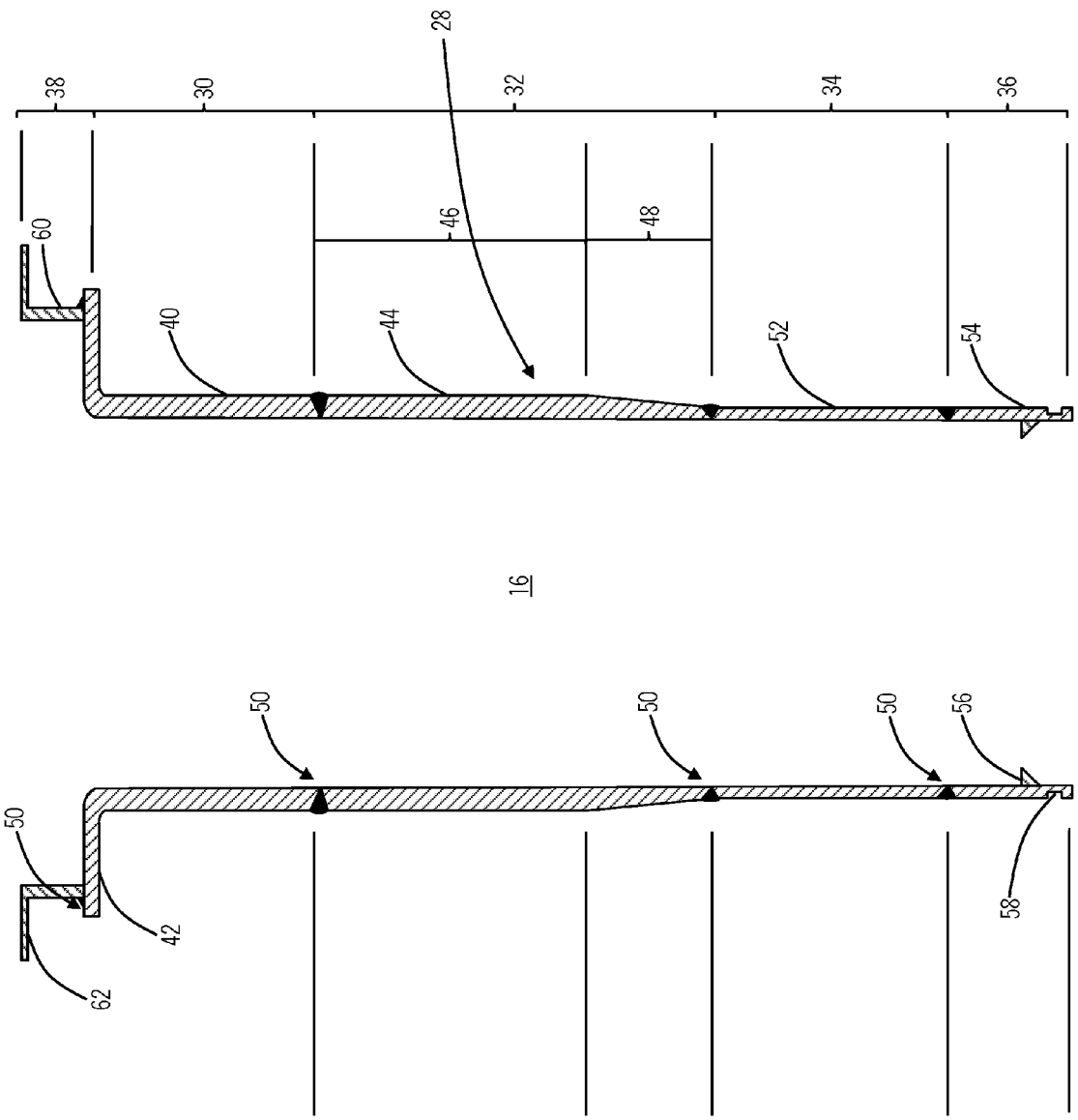
FIG. 3 is a cross-sectional side view illustrating one exemplary embodiment of the reformer tube apparatus of the present invention.

Referring specifically to FIG. 3, in one exemplary embodiment of the present invention, each reformer tube apparatus 16 includes a generally axially aligned tubular structure 28 including a plurality of components. These components include a flange section 30, a top section 32, a middle section 34, and a bottom section 36. Coupled to the flange section 30 is a secondary flange section 38. Each of the components is described in greater detail herein below. As used herein, "tubular" refers to a generally circular cross-sectional shape, although other cross-sectional shapes are also contemplated.

The flange section 30 includes a tubular structure 40 having an inside diameter of about 260-300 mm, an outside diameter of about 290-330 mm, with a wall thickness of about 12-15 mm, and an overall length of about 90 mm, although other suitable dimensions may be utilized. The flange section 30 may be manufactured from an HP-MA alloy, a heat resistant alloy including Cr, Ni, and Fe plus other elements characterized within the family of superalloys, or another novel material, and the surfaces thereof are preferably shot blasted or the like to remove foreign substances. An outwardly protruding concentric flange 42 is disposed about the top portion of the flange section 30, and has an outside diameter of about 432 mm and a thickness of about 16 mm.

The top section 32 includes a tubular structure 44 having an inside diameter of about 260-300 mm, a varying outside diameter, and an overall length of about 3500 mm, although other suitable dimensions may be utilized. Specifically, the tubular structure 44 of the top section 32 includes a continuous thickness portion 46 having an outside diameter of about 290-330 mm, with a wall thickness of about 12-15 mm, and an overall length of about 2000 mm, although other suitable dimensions may be utilized. The tubular structure 44 of the top section 32 also includes a variable thickness portion 48 having an outside diameter that tapers from about 290-330 mm to about 280-320 mm from top to bottom, with a wall thickness that tapers from about 15 mm to about 10 mm from top to bottom, and an overall length of about 1500 mm, although other suitable dimensions may be utilized. The top section 32 may be manufactured from an HV alloy, a heat resistant alloy including Cr, Ni, and Fe plus other elements characterized within the family of superalloys, or another novel material, and the surfaces thereof are preferably shot blasted or the like to remove foreign substances. It should be noted that any suitable tapering sections (and any suitable number thereof) may be incorporated in the top section 32, or any other section of the reformer tube apparatus 16, although smooth diameter transitions (outside and/or inside) are preferred in order to minimize stress in the material. The top section 32 is joined to the flange section 30 via a weld 50 or other suitable attachment mechanism.

The middle section 34 includes a tubular structure 52 having an inside diameter of about 260-300 mm, an outside diameter of about 280-320 mm, with a wall thickness of about 8-10 mm, and an overall length of about 4900 mm, although other suitable dimensions may be utilized. The middle section 34 may be manufactured from an HP-MA alloy, a heat resistant alloy including Cr, Ni, and Fe plus other elements characterized within the family of superalloys, or another novel material, and the surfaces thereof are preferably shot blasted or the like to remove foreign substances. The middle section 34 is joined to the top section 32 via a weld 50, such weld 50 being designed with a proper "J" weld bevel design and performed using weld filler material of a compatible alloy, or other suitable attachment mechanism.

The bottom section 36 includes a tubular structure 54 having an inside diameter of about 260-300 mm, an outside diameter (which may be variable/tapering) of about 280-320 mm, with a wall thickness (which may be variable/tapering) of about 8-10 mm, and an overall length of about 1060 mm, although other suitable dimensions may be utilized. The bottom section 36 may be manufactured from an HK-MA alloy, a heat resistant alloy including Cr, Ni, and Fe plus other elements characterized within the family of superalloys, or another novel material, and the surfaces thereof are preferably shot blasted or the like to remove foreign substances. The bottom section 36 is joined to the middle section 34 via a weld 50, such weld 50 being designed with a proper "J" weld bevel design or straight "V" weld bevel design and performed using weld filler material of a compatible alloy, or other suitable attachment mechanism. In addition, a plurality of nickel alloy wedge structures 56 or the like are disposed concentrically about and welded to the inside of the tubular structure 54 of the bottom section 36 for supporting an inner catalyst support plate (not illustrated). Likewise, a channel 58 or the like is disposed concentrically about and manufactured into the outside of the tubular structure 54 of the bottom section 36 for mounting a bottom gas-tight flange (not illustrated).

Finally, the secondary flange section 38 includes a tubular structure 60 having an inside diameter of about 394 mm, an outside diameter of about 406 mm, with a wall thickness of about 6 mm, and an overall length of about 71 mm, although other suitable dimensions may be utilized. The secondary flange section 38 may be manufactured from a carbon steel or other suitable alloy or another novel material, and the surfaces thereof are preferably shot blasted or the like to remove foreign substances. An outwardly protruding concentric secondary flange 62 is disposed about the top portion of the secondary flange section 38, and has an outside diameter of about 485 mm and a thickness of about 6 mm. The secondary flange section 38 is joined to the flange section 30 via a weld 50, such weld 50 being designed with a proper "J" weld bevel design or straight "V" weld bevel design and performed using weld filler material of a compatible alloy, or other suitable attachment mechanism. The secondary flange section 38 is utilized to join the reformer tube assembly to a reformed gas header (not illustrated) by means of welding, for example. All components of the reformer tube assembly 16 may also be integrally formed, of course. Tubular components and heat resistant alloy flanges are preferably manufactured using a centrifugal casting process.

Again, in various exemplary embodiments, the present invention provides a reformer tube apparatus 16 having a variable wall thickness and manufactured from a novel metallurgical alloy. This design and material combination results in longer operation at current temperature requirements or equal operation at increased temperature requirements. Wall thickness is increased only at localized sections of the reformer tube apparatus 16, where resistance to deformation is required. Transitions to conventional thicknesses are provided, and are gradual, such that stresses are minimized as compared to welded joints. It is expected that 4-6 years of tube life may be added, or that tube temperatures, and overall DR process production, may be increased accordingly.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims. In this respect, this specification is to be considered non-limiting and all-encompassing.

What is claimed is:

1. A reformer tube apparatus, comprising:
an axially aligned tubular structure disposed within a refractory lined reformer furnace housing and selectively containing a catalyst;
wherein the axially aligned tubular structure comprises a first portion having a first wall thickness;
wherein the axially aligned tubular structure comprises a second portion having a second wall thickness;
wherein the axially aligned tubular structure comprises a third portion having a transitioning wall thickness that joins the first portion to the second portion;
wherein the axially aligned tubular structure has a substantially constant internal diameter corresponding to the first portion, the second portion, and the third portion;
wherein the axially aligned tubular structure further comprises a primary flange section, wherein the primary flange section comprises a primary concentric flange disposed about a top portion thereof and extending perpendicularly outward from the axially aligned tubular structure; and
wherein the axially aligned tubular structure further comprises a secondary flange section, wherein the secondary flange section comprises a secondary concentric flange disposed about a top portion of the primary concentric flange of the primary flange section.

2. The reformer tube apparatus of claim 1, wherein the reformer tube apparatus is manufactured from a heat resistant alloy including Cr, Ni, and Fe plus other elements characterized within the family of superalloys.

3. The reformer tube apparatus of claim 1, wherein the axially aligned tubular structure further comprises a top section, wherein the first portion and the second portion of the axially aligned tubular structure are portions of the top section.

4. The reformer tube apparatus of claim 1, wherein the axially aligned tubular structure further comprises a middle section.

5. The reformer tube apparatus of claim 1, wherein the axially aligned tubular structure further comprises a bottom section.

6. The reformer tube apparatus of claim 5, wherein the bottom section of the tubular structure comprises a plurality of concentric wedge structures disposed about the interior thereof.

7. The reformer tube apparatus of claim 5, wherein the bottom section of the tubular structure comprises a recess disposed about the exterior thereof.

8. The reformer tube apparatus of claim 1, wherein the reformer tube apparatus is disposed within a reformer used in a direct reduction process.

9. A reformer tube apparatus, comprising:
   an axially aligned tubular structure disposed within a refractory lined reformer furnace housing and selectively containing a catalyst, the axially aligned tubular structure comprising a primary flange section, a top section, a middle section, and a bottom section;
   wherein the top section of the axially aligned tubular structure comprises a first portion having a first wall thickness;
   wherein the top section of the axially aligned tubular structure comprises a second portion having a second wall thickness;
   wherein the top section of the axially aligned tubular structure comprises a third portion having a transitioning wall thickness that joins the first portion to the second portion;
   wherein the axially aligned tubular structure has a substantially constant internal diameter corresponding to the first portion, the second portion, and the third portion;
   wherein the primary flange section comprises a primary concentric flange disposed about a top portion thereof and extending perpendicularly outward from the axially aligned tubular structure; and
   wherein the axially aligned tubular structure further comprises a secondary flange section, wherein the secondary flange section comprises a secondary concentric flange disposed about a top portion of the primary concentric flange of the primary flange section.

10. The reformer tube apparatus of claim 9, wherein the reformer tube apparatus is manufactured from a heat resistant alloy including Cr, Ni, and Fe plus other elements characterized within the family of superalloys.

11. The reformer tube apparatus of claim 9, wherein the first wall thickness is greater than the second wall thickness.

12. The reformer tube apparatus of claim 9, wherein the bottom section of the tubular structure comprises a plurality of concentric wedge structures disposed about the interior thereof.

13. The reformer tube apparatus of claim 9, wherein the bottom section of the tubular structure comprises a recess disposed about the exterior thereof.

14. The reformer tube apparatus of claim 9, wherein the reformer tube apparatus is disposed within a reformer used in a direct reduction process.

15. A method for providing a reformer tube apparatus, comprising:
   providing an axially aligned tubular structure disposed within a refractory lined reformer furnace housing and selectively containing a catalyst, the axially aligned tubular structure comprising a primary flange section, a top section, a middle section, and a bottom section;
   wherein the top section of the axially aligned tubular structure comprises a first portion having a first wall thickness;
   wherein the top section of the axially aligned tubular structure comprises a second portion having a second wall thickness;
   wherein the top section of the axially aligned tubular structure comprises a third portion having a transitioning wall thickness that joins the first portion to the second portion;
   wherein the axially aligned tubular structure has a substantially constant internal diameter corresponding to the first portion, the second portion, and the third portion;
   wherein the primary flange section comprises a primary concentric flange disposed about a top portion thereof and extending perpendicularly outward from the axially aligned tubular structure; and
   wherein the axially aligned tubular structure further comprises a secondary flange section, wherein the secondary flange section comprises a secondary concentric flange disposed about a top portion of the primary concentric flange of the primary flange section.

16. The method of claim 15, wherein the first wall thickness is greater than the second wall thickness.

17. The method of claim 15, wherein the bottom section of the tubular structure comprises a plurality of concentric wedge structures disposed about the interior thereof.

18. The method of claim 15, wherein the bottom section of the tubular structure comprises a recess disposed about the exterior thereof.

* * * * *